US008095674B2

(12) United States Patent
Ye et al.

(10) Patent No.: US 8,095,674 B2
(45) Date of Patent: Jan. 10, 2012

(54) METHOD, SYSTEM AND TERMINAL FOR ACCESS CONTROL IN DEVICE MANAGEMENT

(75) Inventors: Fujun Ye, Shenzhen (CN); Xiaoqian Chai, Shenzhen (CN); Linyi Tian, Shenzhen (CN); Kepeng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/697,418

(22) Filed: Feb. 1, 2010

(65) Prior Publication Data

US 2010/0138537 A1 Jun. 3, 2010

Related U.S. Application Data

(63) Continuation of application No. PCT/CN2008/071722, filed on Jul. 22, 2008.

(30) Foreign Application Priority Data

Jul. 31, 2007 (CN) .......................... 2007 1 0143456

(51) Int. Cl.
*G06F 15/16* (2006.01)
(52) U.S. Cl. .......................... 709/229; 709/223; 709/203
(58) Field of Classification Search .................. 709/229, 709/223, 203
See application file for complete search history.

(56) References Cited

U.S. PATENT DOCUMENTS

| 6,038,563 | A | * | 3/2000 | Bapat et al. ............................ 1/1 |
| 6,064,656 | A | * | 5/2000 | Angal et al. .................. 370/254 |
| 6,085,191 | A | * | 7/2000 | Fisher et al. .................. 707/737 |
| 2006/0143179 | A1 | | 6/2006 | Draluk et al. |
| 2007/0162980 | A1 | * | 7/2007 | Moloney et al. ................. 726/27 |
| 2008/0034108 | A1 | * | 2/2008 | Chapweske .................... 709/234 |
| 2011/0231537 | A1 | * | 9/2011 | Song et al. .................... 709/223 |

FOREIGN PATENT DOCUMENTS

| CN | 101001148 A | 7/2007 |
| WO | WO-2006092642 A1 | 9/2006 |

OTHER PUBLICATIONS

"SyncML Representation Protocol," Open Mobile Alliance, OMA-SyncML-RepPro-V1_2_1-20070612-A, Approved Version 1.2.1—Jun. 12, 2007.

(Continued)

*Primary Examiner* — Kenneth R Coulter
(74) *Attorney, Agent, or Firm* — Finnegan, Henderson, Farabow, Garrett & Dunner LLP

(57) ABSTRACT

A method for access control in device management includes: by a terminal, receiving a command that includes a node identifier of a target ID from a server; judging whether the server rights meet preset rights; running the command when the server rights meet the preset rights and the server has an access right (ACL) of the target node identified by the node identifier. The present invention solves the problem that the MOs are beyond control because any server can create any type of MOs in the terminal, thus improving the security of the system. A system and terminal for access control in device management are also provided.

6 Claims, 13 Drawing Sheets

OTHER PUBLICATIONS

"OMA Device Management Tree and Description," Open Mobile Alliance, OMA-TS-DM_TND-V1_2-20070209-A, Approved Version 1.2—Feb. 9, 2007.

"OMA Device Management Protocol," Open Mobile Alliance, OMA-TS-DM_Protocol-V1_2-20070209-A, OMA Device Management Protocol, Approved Version 1.2—Feb. 9, 2007.

Extended European Search Report dated (mailed) Apr. 15, 2011, issued in related Application No. 087837.3-1244, PCT/CN2008071722, Hauwei Technologies Co., Ltd.

Written Opinion of the International Searching Authority (translation) dated (mailed) Nov. 6, 2008, issued in related Application No. PCT/CN2008/071722, filed Jul. 22, 2008, Huawei Technologies Co., Ltd.

First Chinese Office Action issued in related Chinese Application No. 200710143456.3 Mailing Date: Aug. 17, 2011, Huawei Technologies Co., Ltd.

* cited by examiner

METHOD, SYSTEM AND TERMINAL FOR ACCESS CONTROL IN DEVICE MANAGEMENT

CROSS-REFERENCE TO RELATED APPLICATIONS

This application is a continuation of International Application No. PCT/CN2008/071722, filed on Jul. 22, 2008, which claims priority to Chinese Patent Application No. 200710143456.3, filed on Jul. 31, 2007, both of which are hereby incorporated by reference in their entireties.

FIELD OF THE INVENTION

The present invention relates to a device management technology in the communications field, and in particular, to access control in device management.

BACKGROUND OF THE INVENTION

A device management (DM) specification of the Open Mobile Alliance (OMA) defines a remote control technology for terminal management, diagnosis and maintenance. In the remote control technology, a server can perform such management operations as firmware update, software download, diagnosis monitoring, and backup and restoration through a DM tree. The terminal may be a mobile phone, a personal digital assistant (PDA), a computer, an embedded device or a vehicle mounted system.

FIG. 1 shows an overall structure of the DM specification. A DM agent in a terminal is adapted to interpret and run management commands sent from a DM server; a DM tree stored in the terminal may be considered to be an interface through which the DM server manages the terminal via a DM protocol, including some basic management objects (MOs); the DM server controls the terminal resource by operating the MO; commands include Get, Replace, Exec, Copy, and Delete. FIG. 2 shows a structure of a DM tree.

With continuous improvement of terminal capabilities and diversification and personalization of user demands, services from multiple service providers are required. The service providers may be value-added service providers, enterprises or operators, which may provide services through different servers.

The access rights of the servers are mainly controlled through an access control list (ACL).

Each node in the DM tree is allocated an ACL. The rights of the servers to operate the nodes in the DM tree are controlled through the ACL. The following describes an ACL allocation method:

The ACL of the root node in the DM tree is not null. ACLs of other internal nodes and leaf nodes under the root node may be null or assigned values. If the ACLs are null, the internal nodes or leaf nodes inherit the ACL of their parent node by default. The rule for implementing the ACL is as follows: Each command is assigned an ID of a server that can operate the ACL, and the server that has the rights to replace the parent node may modify the ACL of child nodes.

According to the current DM protocol, access control may include the following four aspects:

1. The ACL of the root node is set to "Add=*&Get=*", indicating that any server can add nodes to the root node.
2. If the ACL of a node is null, the node inherits the rights of its parent node.
3. A server that has the rights to modify a node can modify the rights of the server of the node (except the leaf node).
4. A server that has the rights to replace the parent node may modify the ACL of child nodes.

The prior art has at least the following defects:

FIG. 3 shows a structure of a DM tree and its internal nodes that are allocated ACLs via the current DM protocol. As shown in FIG. 3, the ACL of the root node in the DM tree is set to "Add=*&Get=*", and "Add=*" cannot be modified by any server, which indicates that any server can have the rights to add nodes. Thus, any server can create an MO in the terminal and manage and operate the terminal by using the created MO. In this case, each server has the same rights, which causes a failure to control the MO.

In addition, the type of MOs created by the server cannot be limited. That is, the server may create any MO. For example, assume server A is responsible for firmware update only, the server A is forbidden to create a software component management object (SCOMO). However, in the prior art, the server has the Add rights in the root node, so that the server A still can create the SCOMO in the terminal. This case is similar to the creation of a firmware update management object (FUMO) or a device capability management object (DCMO).

SUMMARY OF THE INVENTION

Embodiments of the present invention provide a method, system and terminal for access control in device management to control the terminal management rights of a server, so that the terminal management operation of the server is controllable.

A method for access control in device management in an embodiment of the present invention includes:

receiving, by a terminal, a command that includes a node identifier of a target node from a server; and judging whether the rights of the server meet preset rights; running the command when the rights of the server meet the preset rights and the server has the ACL of the target node identified by the node identifier.

A system for access control in device management in an embodiment of the present invention includes:

a server, adapted to send a command that includes a node identifier of a target node; and a terminal, adapted to judge whether the rights of the server meet preset rights after receiving the command from the server; run the command when the rights of the server meet the preset rights and the server has the ACL of the target node identified by the node identifier.

A terminal in an embodiment of the present invention includes:

a receiving unit, adapted to receive a command that includes a node identifier of a target node from a server;

a judging unit, adapted to judge whether the rights of the server meet preset rights and whether the server has the ACL of the target node identified by the node identifier, and send the judgment result; and a running unit, adapted to run the command if the judgment result received from the judging unit is that the rights of the server meet the preset rights and the server has the ACL of the target node.

Another method for access control in device management in an embodiment of the present invention includes:

configuring a device management account (DMAcc) management object (MO) that includes a home group of the server;

adding rights of the group to the ACLs of nodes in the DM tree;

receiving a command that includes a node identifier of a target node from a server; and judging whether the server or the home group of the server has the ACL of a target node identified by the node identifier; if so, running the command.

In the embodiments of the present invention, when the rights of the server meet the preset rights and the server has the ACL of the target node in the command, the command is run. In this way, the terminal management rights of the server are controlled, and thus improves the security of the system.

BRIEF DESCRIPTION OF THE DRAWINGS

To make the technical solution under the present invention or in the prior art clearer, the accompanying drawings for illustrating the embodiments of the present invention or illustrating the prior art are outlined below. Evidently, the accompanying drawings are exemplary only, and those skilled in the art can derive other drawings from such accompanying drawings without creative work.

DETAILED DESCRIPTION OF THE INVENTION

The technical solution of the present invention is hereinafter described in detail with reference to the accompanying drawings. It is evident that the embodiments are exemplary only and the present invention is not limited to such embodiments. Other embodiments that those skilled in the art derive from the embodiments of the present invention also fall in the scope of protection of the present invention.

In the embodiments of the present invention, in a system where any server can create any MO in a terminal, the terminal receives a command that includes a node identifier of a target node from a server; the terminal judges whether the rights of the server meet the preset rights and whether the server has the ACL of the target node identified by the node identifier in the command; if so, the terminal runs the command; otherwise, the terminal does not run the command.

The server described in the embodiments of the invention may be a DM server.

The embodiments of the invention are described in detail with reference to the accompanying drawings.

Figure 1:
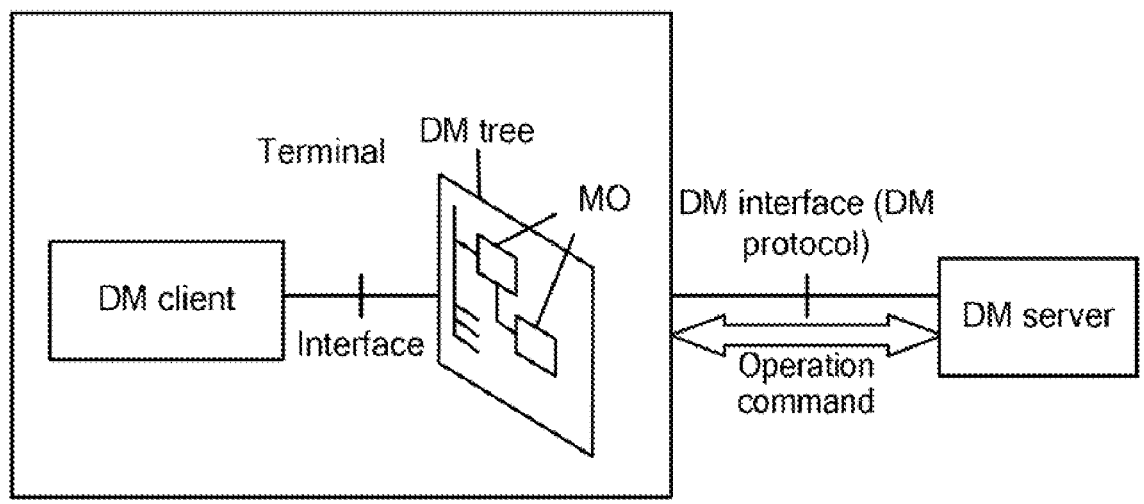
FIG. 1 shows an overall structure of a DM specification in the prior art.
Figure 2:
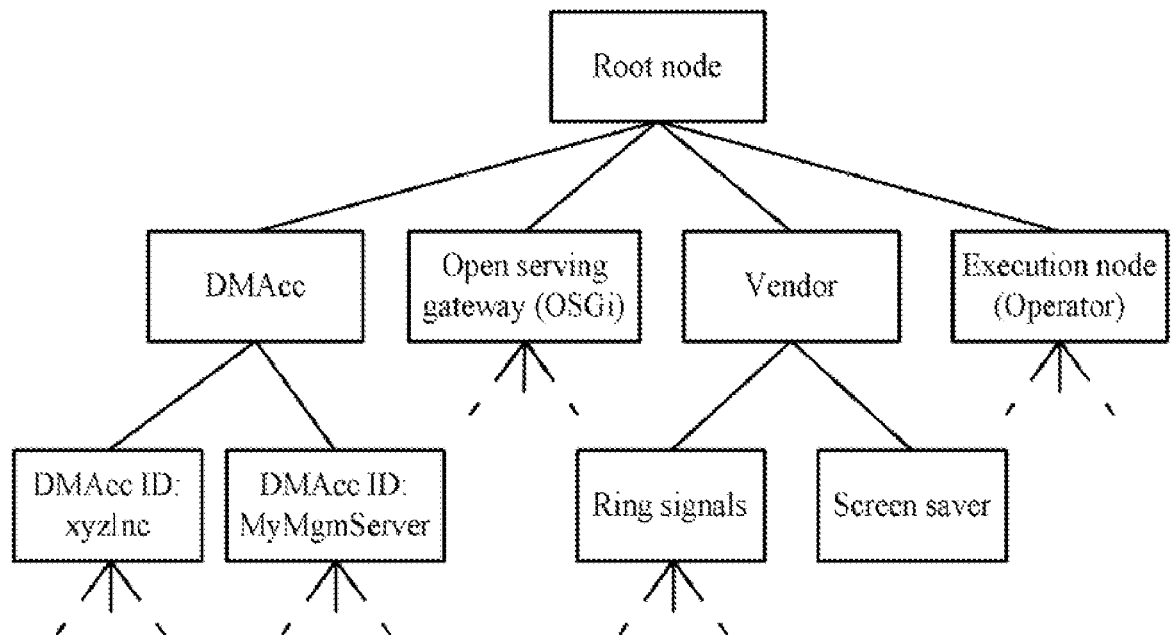
FIG. 2 shows a structure of a DM tree in the prior art.
Figure 3:
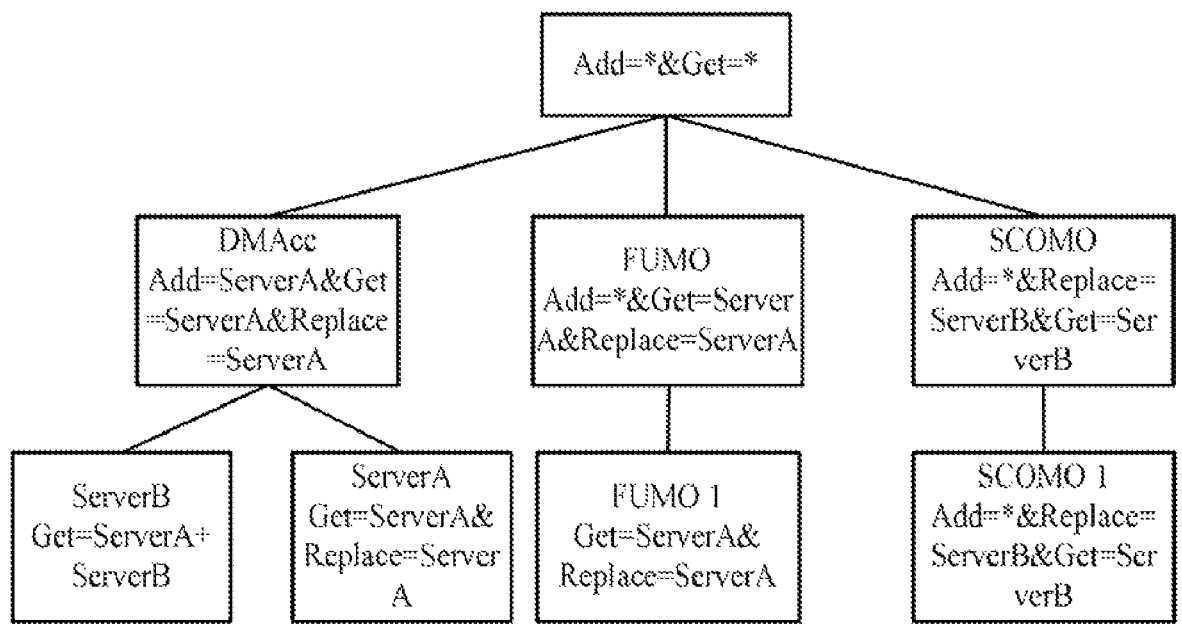
FIG. 3 is a schematic diagram illustrating an ACL of each node in a DM tree in the current DM protocol.
Figure 4:
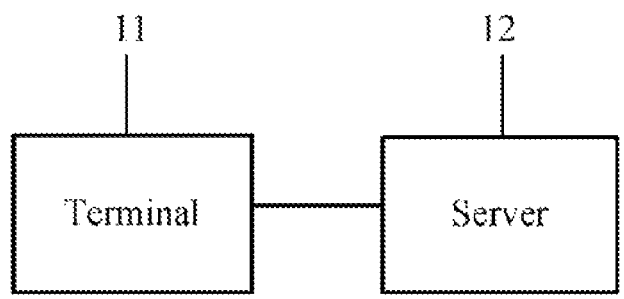
FIG. 4 shows a structure of a system that implements access control in device management in an embodiment of the present invention.

FIG. 4 shows a structure of a system that implements access control in device management in an embodiment of the present invention. The system includes a terminal 11 and a server 12. The server 12 is adapted to send a command that includes a node identifier of a target node to the terminal 11. The terminal 11 is adapted to judge whether the rights of the server 12 meet the preset rights after receiving the command; run the command when the rights of the server 12 meet the preset rights and the server has the ACL of the target node identified by the node identifier; do not run the command if any of the preceding two conditions is not met.

The terminal 11 is further adapted to configure a DMAcc MO of the server 12 in the terminal 11, where the DMAcc MO includes rights of the server 12.

In this embodiment, if the terminal 11 sets different server rights in the DMAcc, the process of judging whether the rights of the server meet the preset rights may be different, including but not limited to the following cases:

1. The terminal 11 is further adapted to set server rights in the DMAcc MO, where the server rights indicate the type of operable nodes.

When the type of operable nodes indicated in the server rights includes the type of a node to be operated by the server, the terminal 11 determines that the server rights meet the preset rights. When the type of operable nodes indicated in the server rights includes the type of a node to be operated by the server, the terminal 11 determines that the server rights do not meet the preset rights.

2. The terminal is further adapted to set the server rights in the DMAcc MO, where the server rights indicate that the server can run the command, or indicate that the server cannot run the command, or indicate that the server can run the command conditionally and indicate the type of operable nodes.

The terminal 11 is adapted to: when the set server rights indicate that the server can run the command, determine that the server rights meet the preset rights; when the set server rights indicate that the server cannot run the command, determine that the server rights do not meet the preset rights; when the set server rights indicate that the server can run the command conditionally and the indicated type of operable nodes includes the type of a node to be operated by the server, determine that the server rights meet the preset rights.

The following describes the working process of the system: After the server sends a command that includes a node identifier of a target node to a terminal, the terminal needs to judge whether the server rights meet the preset rights and whether the server has the ACL of the target node identified by the node identifier in the command before running the command; if the preceding two conditions are met, the terminal runs the command; otherwise, the terminal does not run the command.

The following describes the present invention in detail with reference to embodiments.

Figure 5:
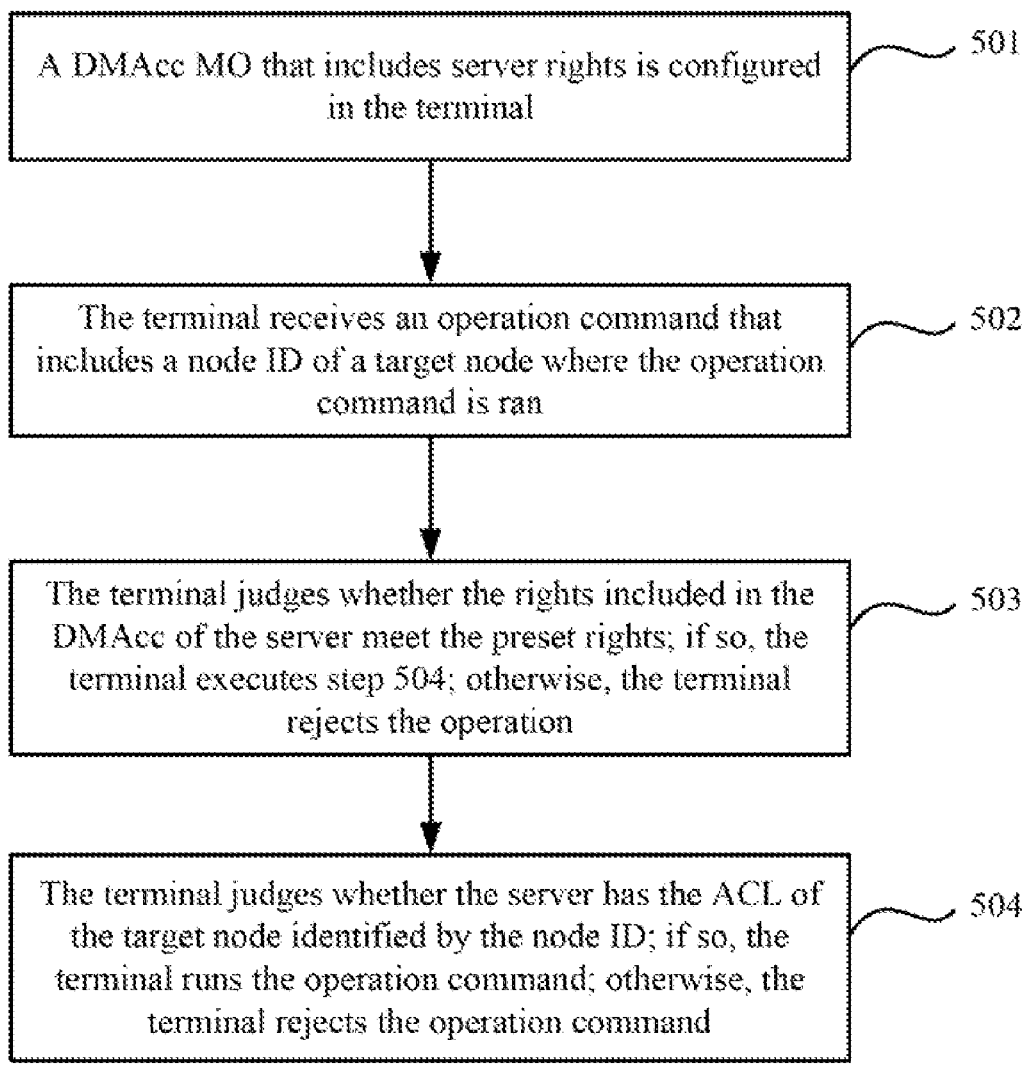
FIG. 5 is a flowchart of a method for access control in device management in an embodiment of the present invention.

FIG. 5 is a flowchart of a method in an embodiment of the present invention. The method includes the following steps:

Step 501: A DMAcc MO that includes the server rights is configured in the terminal.

Before the terminal initiates a session with the server, a server account (also the DMAcc MO) needs to be configured in the terminal to store parameter information required for the session connection between the terminal and the server. A DMAcc MO corresponds to a server, and includes an application ID, a server ID, a server name, a exemplary connection parameter, one or multiple connection parameters, one or multiple server addresses, a exemplary authentication mode, and one or multiple authentication related information items. Three modes for configuring the DMAcc MO are available: customized bootstrap, bootstrap from smart card, and server initiated bootstrap. After being configured, the DMAcc in the terminal includes server rights corresponding to the DMAcc.

Step 502: The terminal receives a command that includes a node identifier of a target node where the command is run.

The command may be a DM command, and include a server ID and a target node identifier. The DM command includes Add or Replace, where the Add command is adapted to create a node or an MO of which the type is management object identifier (MOI); and the Replace command is adapted to change the type of an internal node to the MOI.

The Add command includes one or multiple target node identifiers, which indicate where to add a node (called target node). The node to be added is carried in a Data element and a Meta element and such node is called an operated node. In this case, the server rights are adapted to specify whether the node can be added by the server, and the ACL is adapted to specify whether the Add command can be performed for the target node. The Replace command is similar to the Add command. For Exec and Get commands, their target nodes are also operated nodes.

In this embodiment, the node where the command is run is defined as the object operated by the command. That is, for the Add and Replace commands, the operated node refers to added or changed nodes or a set of added or changed nodes. For the Exec and Get commands, the operated node refers to a node path identifier specified in the target, that is, the target node.

Step 503: The terminal judges whether the rights included in the DMAcc of the server meet the preset rights; if so, the terminal executes step 504; otherwise, the terminal does not run the command.

In this embodiment, if the command is Add or Replace, the server rights include but are not limited to one or multiple of following rights: whether to create a node, whether to change a node type, and whether to create a specified type of nodes.

Certainly, if the command is Get, Delete or Copy, the server rights may also be rights corresponding to the command, for example, whether to delete nodes or whether to copy nodes.

Step 504: The terminal judges whether the server has the ACL of the target node identified by the node identifier; if so, the terminal runs the command; otherwise, the terminal does not run the command.

Obviously, step 503 and step 504 may be run in random sequence. The user may determine the server rights or ACL earlier according to the actual requirement.

In step 501 to step 504, multiple implementation modes are available for each step, which are hereunder described in detail.

Figure 6:
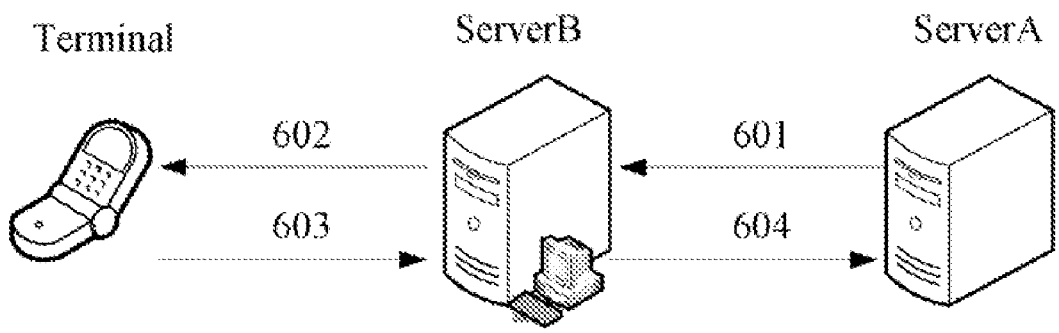
FIG. 6 is a flowchart of configuring a DMAcc of a server in a terminal in a first embodiment of the present invention.
Figure 7:
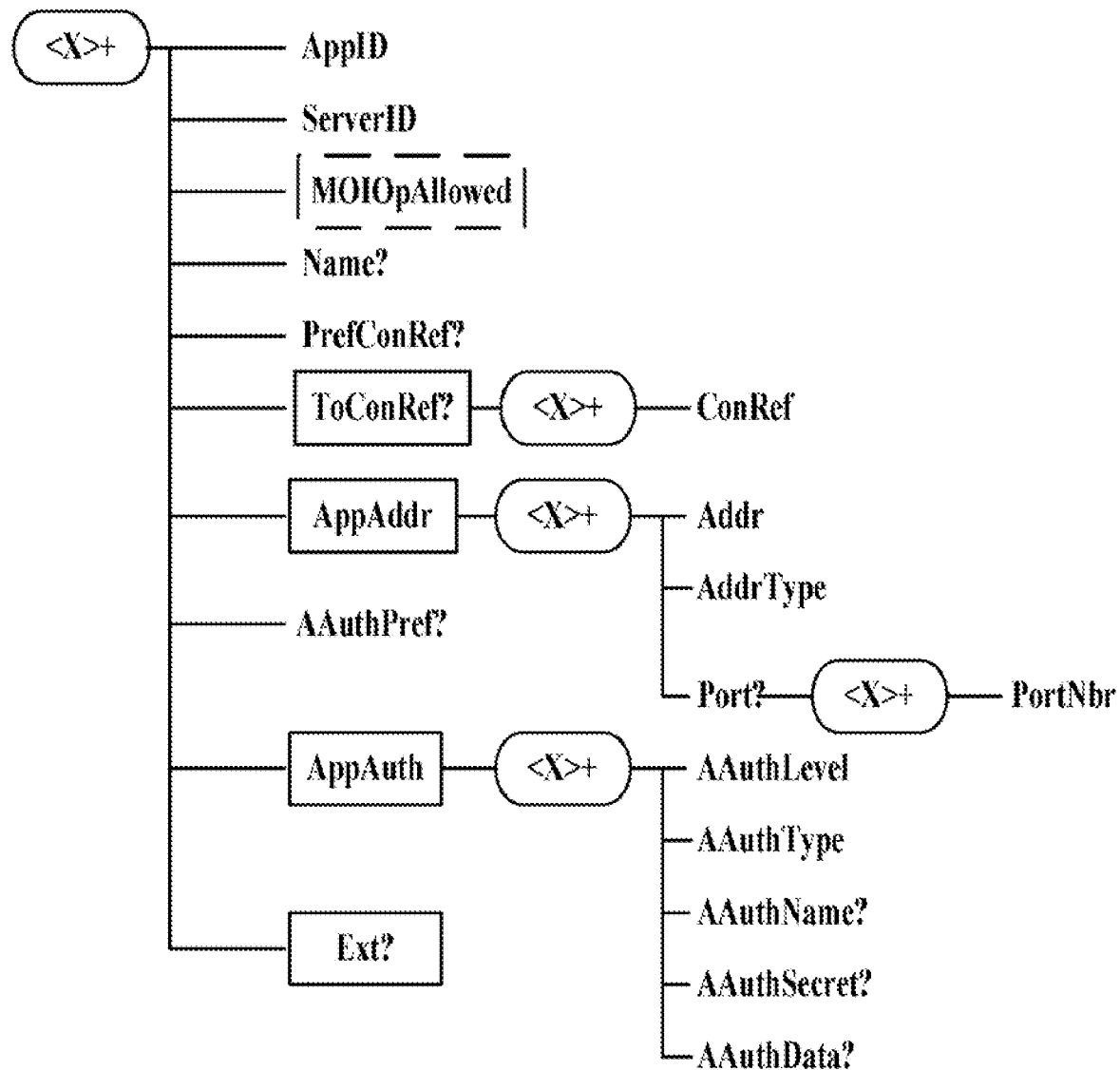
FIG. 7 shows a structure of a DMAcc of a server in a second embodiment of the present invention.

Before the terminal establishes a session with the server, a DMAcc of the server is configured in the terminal. In the first embodiment of the present invention, the server A needs to configure its DMAcc in the terminal; the server B can establish a session with the terminal and has the rights to create nodes of which the type is MOI (FIG. 7 shows a structure of the DMAcc of the server). As shown in FIG. 6, the configuration process includes the following steps:

Step 601: The server A sends a DMAcc creation request to the server B, and sends information required by the bootstrap, such as the ID of a terminal creating the DMAcc, DMAcc information of the server A, and authentication information between the server A and the server B.

Obviously, the request and the information may be sent separately or the information may be carried in the request.

The terminal ID is pre-obtained by the server A. The way of pre-obtaining the terminal ID by the server A includes but is not limited to: sending a request to or registering with the server A.

Step 602: After receiving the request and the information, the server B retrieves the terminal ID from the information and establishes a DM session with a terminal identified by the terminal ID, requesting to add a DMAcc MO corresponding to the server A to the DM tree.

Step 603: The terminal judges whether the rights in the DMAcc of the server B meet the requirement; if so, the terminal adds a DMAcc MO corresponding to the server A to the DM tree, and returns an operation response to the server B; otherwise, the terminal does not add the DMAcc MO and returns an operation response to the server B.

Figure 8:
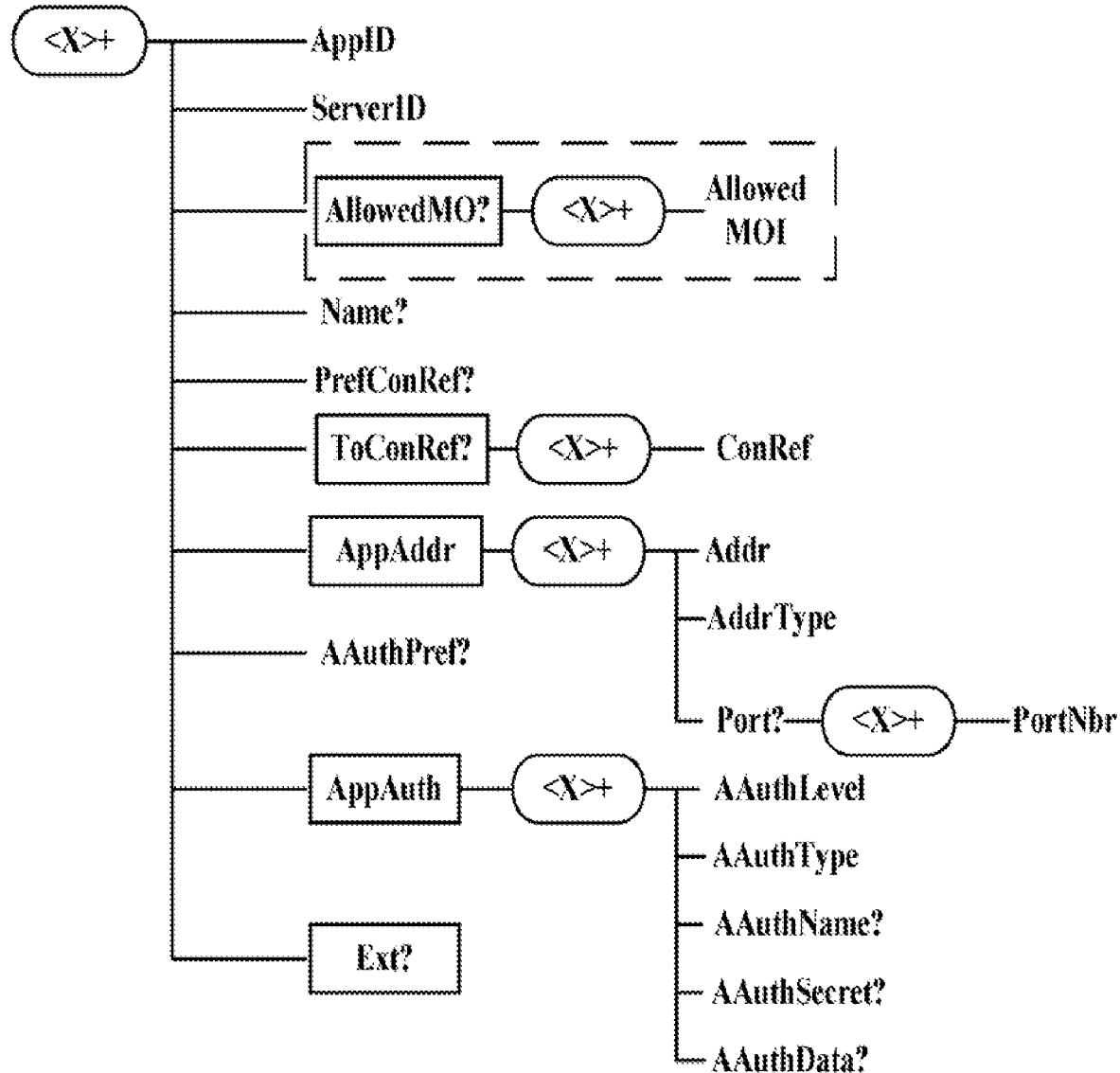
FIG. 8 shows a structure of a DMAcc of a server in a third embodiment of the present invention.
Figure 9:
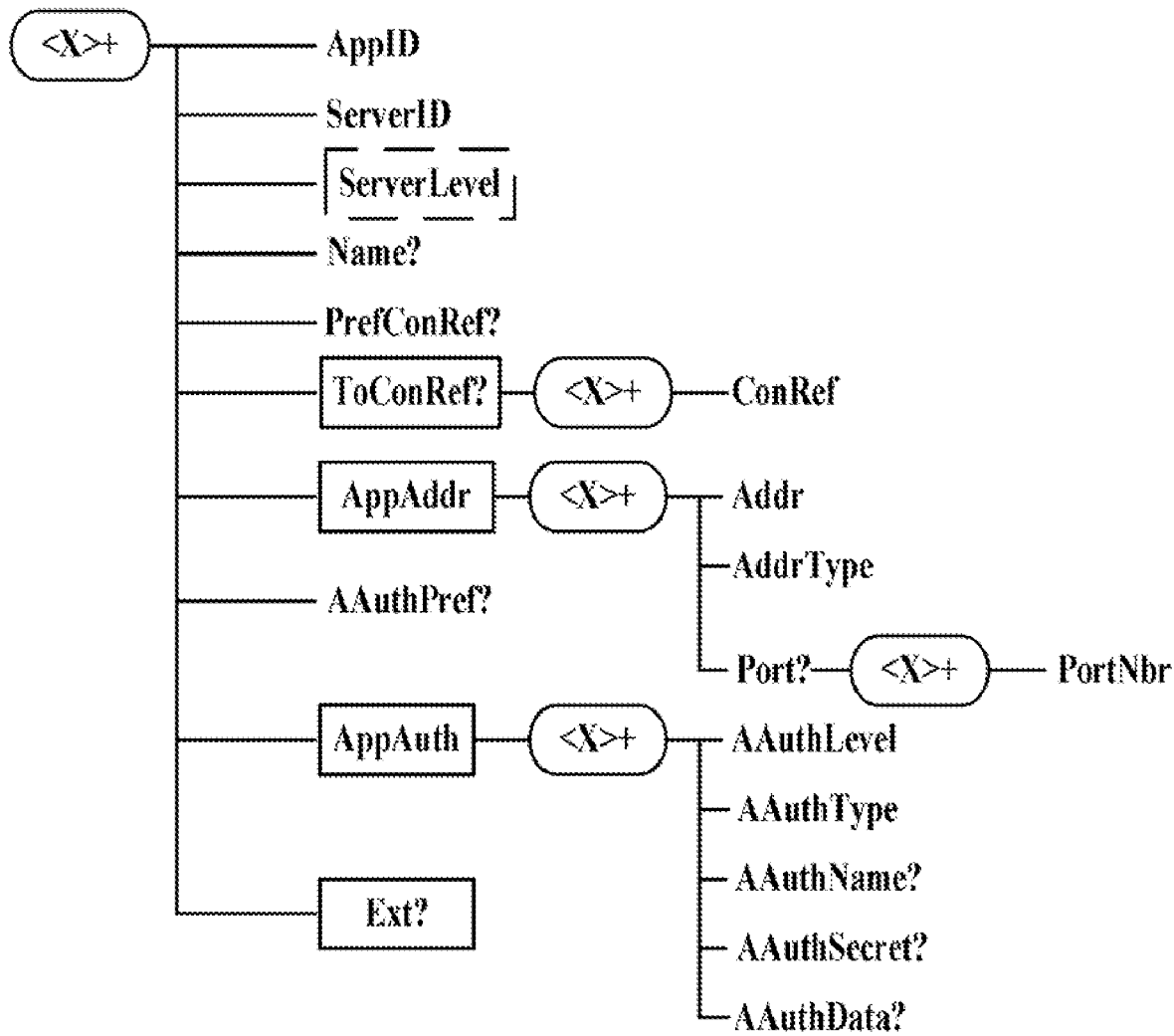
FIG. 9 shows a structure of a DMAcc of a server in a fourth embodiment of the present invention.

The requirement that the DMAcc of the server B needs to meet includes but is not limited to the following aspects: The MOIOpAllowed in the DMAcc MO of the server B is equal to 1 (as shown in FIG. 7), or the AllowedMOI includes the DMAcc type (as shown in FIG. 8), or the ServerLevel is equal to 0 (as shown in FIG. 9).

Step 604: The server B returns the received operation response to the server A.

To restrict the operation rights of the server A when the DMAcc of the server A is created in the terminal through the first embodiment or other methods, the second embodiment of the present invention provides a method for setting server rights in the configured DMAcc. The server rights indicate whether the server can run the command. The following describes the second embodiment, assuming that the command is Add.

To restrict the Add operation rights of the server A, a new node of "MOIOpAllowed" is added to the DMAcc of the server A in the terminal, as shown in the dashed border in FIG. 7. The new MOIOpAllowed node is adapted to indicate whether the server A has the rights to create a node of which the type is MOI or to change the type of a node to the MOI. Different values may be assigned to the MOIOpAllowed to indicate whether the server can perform the Add operation.

Table 1 lists the information of the MOIOpAllowed node. The occurrence of the MOIOpAllowed is 1 in the DMAcc; the format of the MOIOpAllowed node may be Boolean (bool), integer (int), or character (chr). In this embodiment, the format of the MOIOpAllowed is bool and the minimum access type is Get. Table 2 describes possible values of the MOIOpAllowed and meanings thereof.

TABLE 1

| Tree Occurrence | Format | Min. Access Types |
| --- | --- | --- |
| One | Bool | Get |

TABLE 2

| MOIOpAllowed | Description |
|---|---|
| true | Able to create a node of which the type is MOI and to change the type of a node to the MOI. |
| false | Unable to create a node of which the type is MOI or to change the type of a node to the MOI. |

In the solution provided in the second embodiment, when the server A requests to add MOs to the terminal in subsequent management sessions, the terminal judges whether the rights of the server A meet the requirement according to the MOIOpAllowed node corresponding to the DMAcc of the server A. When the value of the MOIOpAllowed node is true, that is, it is allowed to create a node of which the type is MOI, the terminal adds MOs to the DM tree when the server A has the ACL of the target node for adding MOs. When the value of the MOIOpAllowed node is false, that is, it is not allowed to create a node of which the type is MOI, the terminal does not add the MOs.

The rights added to the MOIOpAllowed node may be determined by the terminal or the server that creates the DMAcc. If the DMAcc of the server A is created by the server B in the first embodiment, the rights added to the MOIOpAllowed may be determined by the server B. Other methods may also be used to determine the rights.

In this embodiment, the process of judging whether the rights of the server A meet the requirement may be performed before or after the process of judging whether the server A has the ACL of the operated node.

In addition, the step of setting rights of other commands of the server A is similar to that of setting rights of the Add command.

The method provided in the second embodiment may solve the problem that any server can create MOs in the terminal and manage and operate the terminal by using the created MOs. Further, to better control the server rights, the third embodiment of the present invention provides a method. In the method, when the server has the rights to operate nodes in the DM tree, the server is restricted to operate a specified type of nodes only. That is, the server rights are set in the DMAcc to indicate the type of operable nodes; if the type of operable nodes indicated in the server rights includes the type of nodes to be operated, the server rights meet the preset rights; if the type of operable nodes indicated in the server rights does not include the type of nodes to be operated, the server rights do not meet the preset rights. This embodiment also takes the server A and Add command as an example. In this embodiment, the node type refers to application type, that is, the MOI. In the DM protocol, the node type is represented by Type.

A new node AllowedMO and its child node AllowedMOI are added to the DMAcc of the server A in the DM tree. There is at least one child node AllowedMOI in the DM tree, as shown in the dashed border in FIG. 8. Whether the new AllowedMO node exists or not may indicate whether the server A can run the Add command. If the AllowedMO node exists, the server A can run the command; if the AllowedMO node does not exist, the server A cannot run the command. When the AllowedMO node exists, the type of operable nodes is added to its child node AllowedMOI. As in the second embodiment, whether the AllowedMO node exists or not, and the type of operable nodes is added to the AllowedMOI child node may be determined by the terminal or the server B that creates the DMAcc.

Table 3 lists the information of the AllowedMO node. The node is an internal node (that is, the format is node), the occurrence of which is 0 or 1. If the occurrence is 0, the server A has no rights to create any node; that is, it cannot run the Add command.

TABLE 3

| Tree Occurrence | Format | Min. Access Types |
|---|---|---|
| Zero or one | Node | Get |

Table 4 lists the information of the AllowedMOI node, the format of which is Chr. Table 5 describes the values of the AllowedMOI node. The values of the AllowedMOI node represent the type of nodes that the server A can create in the DM tree. The value of this node may be MOI. Certainly, the format of the AllowedMOI node may be other types, for example, Int.

TABLE 4

| Tree Occurrence | Format | Min. Access Types |
|---|---|---|
| One or more | Chr | Get |

TABLE 5

| Value of the AllowedMOI Node | Description |
|---|---|
| All | All MOs |
| urn:oma:mo:oma-fumo:1.0(FUMO) | FUMO |
| urn:oma:mo:oma-scomo:1.0(SCOMO) | SCOMO |
| urn:oma:mo:oma-dcmo:1.0(DCMO) | DCMO |
| ... | |

Certainly, the meanings of the values of the AllowedMOI node may be changed as follows: The values of the AllowedMOI represent the type of nodes that the server A cannot create in the DM tree, but other values of the AllowedMOI represent the type of nodes that the server can create in the DM tree.

When the AllowedMOI node doesn't exist, it indicates that the server may create any MO supported by the terminal with the permission of the ACL.

As in the second embodiment, when the terminal determines that the rights of the server A meet the preset rights and the ACL of the operated node permits the server A to add MOs, the server A can perform the operation. Taking the Add command as an example, if the occurrence of the AllowedMO node is 1 and the value of the AllowedMOI node is All, the server A may create any MO in the DM tree; if the value of the AllowedMOI node is "urn:oma:mo:oma-scomo:1.0", the server A may create an SCOMO node in the DM tree; if the Add command requests to create an SCOMO node, the server A may perform the Add operation.

For other commands, the setting of rights of the server A is similar to that involved in the third embodiment.

Obviously, the method provided in the third embodiment cannot only restrict the operations of the server on the DM tree, but also restrict the operations of the server on some internal nodes in the DM tree.

The fourth embodiment of the prevent invention provides a method for controlling the rights of the server. Similar to the second embodiment, this method determines whether the server has the rights to run the command by adding nodes to the DMAcc of the server. The difference between the fourth embodiment and the second embodiment is as follows: In the second embodiment, the method uses the MOI; in the fourth embodiment, the method uses the serverlevel of the server. The following describes the method in the fourth embodiment, assuming that the server is the server A and the command is Add.

A node Serverlevel is added to the DMAcc MO corresponding to the server, as shown in the dashed border in FIG. 9. The Serverlevel node is adapted to indicate whether the server A has the rights to run the Add command. Table 6 lists the Serverlevel node information, in which the format may be any format other than Int, for example, Chr. Table 7 describes the values of the Serverlevel node. When the value of the Serverlevel is 0, it indicates that the right to run the Add command is added to the DMAcc; when the value of the Serverlevel is 1, it indicates that the right not to run the Add command is added to the DMAcc.

The node value may be set or modified by the terminal or the server B. The rights of the server B must meet the following conditions:

1. The server B allows the operation of the MOI, that is, MOIOpAlllowed=1, or the ServerLevel is administrator, that is ServerLevel=0, or the server possesses of right to operate the DMAcc MO (different definitions in different DMAcc structures).

2. The server B has created the DMAcc MO or has Replace rights to the node.

TABLE 6

| Tree Occurrence | Format | Min. Access Types |
|---|---|---|
| One | Integer (Int) | Get |

TABLE 7

| Value of Serverlevel Node | Description |
|---|---|
| 0 (Administrator) | The server can create MO and node. |
| 1 (Lowest administrator) | The server cannot create MO. |

Similarly to the second embodiment and third embodiment, when the server A requests to add MOs to the terminal, the terminal judges whether the rights of the server A meet the preset rights according to the information in the Serverlevel in the DMAcc of the server A, and then adds MOs to the DM tree when determining that the server A has the ACL of the operated node.

Obviously, the combination of the third embodiment and the fourth embodiment may also provide a method for access control. In the fifth embodiment, the server rights are set in the DMAcc MO to indicate whether the server can run the command, or indicate that the server can run the command conditionally and indicate the type of operable nodes. The following describes the method in the fifth embodiment based on the server A and the Add command.

Figure 10:
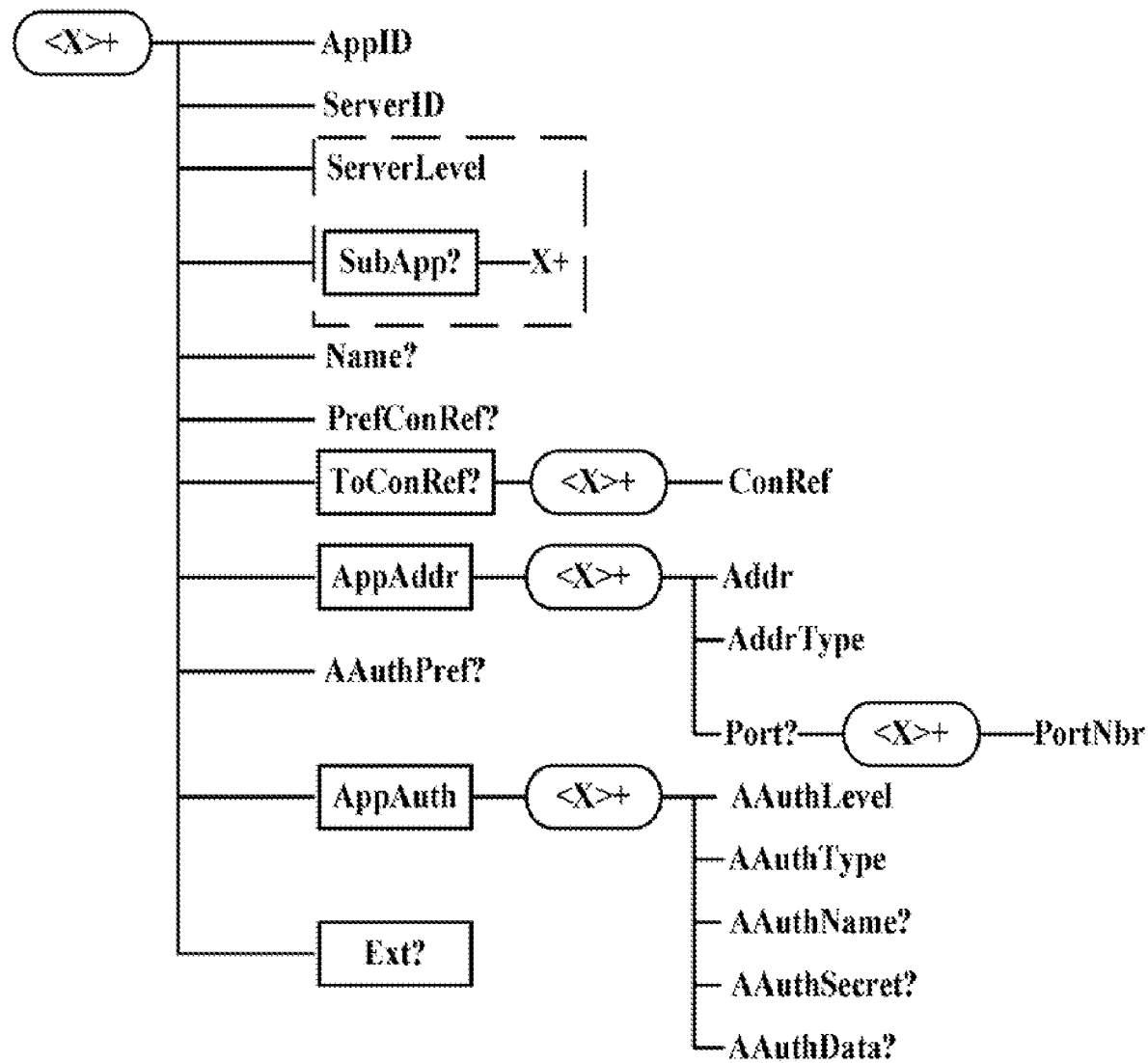
FIG. 10 shows a structure of a DMAcc of a server in a fifth embodiment of the present invention.

In this embodiment, a Serverlevel node and a SubApp node are added to the DMAcc of the server A. The SubApp node has an x child node, in which the content is a child application ID or an MOI, as shown in the dashed border in FIG. 10. The Serverlevel node is adapted to indicate the rights level of the server A. Table 8 lists the information of the Serverlevel node. Table 9 describes the values of the Serverlevel node. When the value of the Serverlevel node is 0, it indicates that the right to run the Add command is added to the DMAcc; when the value of the Serverlevel is 2, it indicates that the right not to run the Add command is added to the DMAcc; when the value of the Serverlevel is 1, it indicates that the right to run the Add command conditionally is added to the DMAcc.

The value of the node may be changed by the terminal or the server B. The Serverlevel of the server B may be administrator or restricted administrator. If the content of the Serverlevel node is determined by the server A, the determined information needs to be agreed by the terminal or the server B.

TABLE 8

| Tree Occurrence | Format | Min. Access Types |
|---|---|---|
| One | Integer (Int) | Get |

TABLE 9

| Serverlevel | Description |
|---|---|
| 0 (Administrator) | The server can create any MO and node. |
| 1 (Restricted administrator) | The server can create specified MO and node. |
| 2 (Lowest administrator) | The server cannot create any MO. |

In addition, table 10 lists the information of the SubApp node. The information of the SubApp node can be changed or deleted only by the terminal and the server B. The Serverlevel of the server B is administrator or restricted administrator. If the content of the Serverlevel node and the information of the SubApp node are determined by the server A, the determined information needs to be agreed by the terminal or the server B. Table 11 lists the information of the x child node. One or more x child nodes are available. Table 12 describes the values of the x child node.

TABLE 10

| Tree Occurrence | Format | Min. Access Types |
|---|---|---|
| Zero or one | Node | Get |

TABLE 11

| Tree Occurrence | Format | Min. Access Types |
|---|---|---|
| One or more | Chr | Get |

TABLE 12

| SubApp/x | Description |
|---|---|
| All | All MOs |
| urn:oma:mo:oma-fumo:1.0(FUMO) | FUMO |
| urn:oma:mo:oma-scomo:1.0(SCOMO) | SCOMO |
| urn:oma:mo:oma-dcmo:1.0(DCMO) | DCMO |
| . . . | |

In this embodiment, the value of the x node may be an MOI, and the format of the x node may be chr. This node can be changed or deleted only by the terminal and the server B. The Serverlevel of the server B is administrator or restricted administrator. Certainly, according to the actual requirement, the values of the x node may be set to represent the type of nodes that the server A cannot operate, while other values may be set to represent the type of nodes that the server A can operate.

The rights of the server A may be determined by the Serverlevel node and the SubApp node. When the value of the Serverlevel is 0, the server A may create any node; when the value of the Serverlevel is 2, the server A cannot create any node; when the value of the Serverlevel is 1, the server A may create customized nodes in the MOI if the SubApp node exists; if the SubApp node does not exist, the server A may not create any node, as shown in Table 13.

TABLE 13

| Serverlevel | SubApp | Description |
| --- | --- | --- |
| 0 | Zero or one (multiple x nodes) | Administrator, who can create any MO and node. |
| 1 | Zero or one (multiple x nodes) | Restricted administrator, who has administrator rights for the MO specified by the SubApp/x. If the SubApp node does not exist, the SubApp cannot create any MO. |
| 2 | Zero or one (multiple x nodes) | Lowest administrator, who cannot create any MO and node. |

The following gives an example to describe the fifth embodiment.

Figure 11:
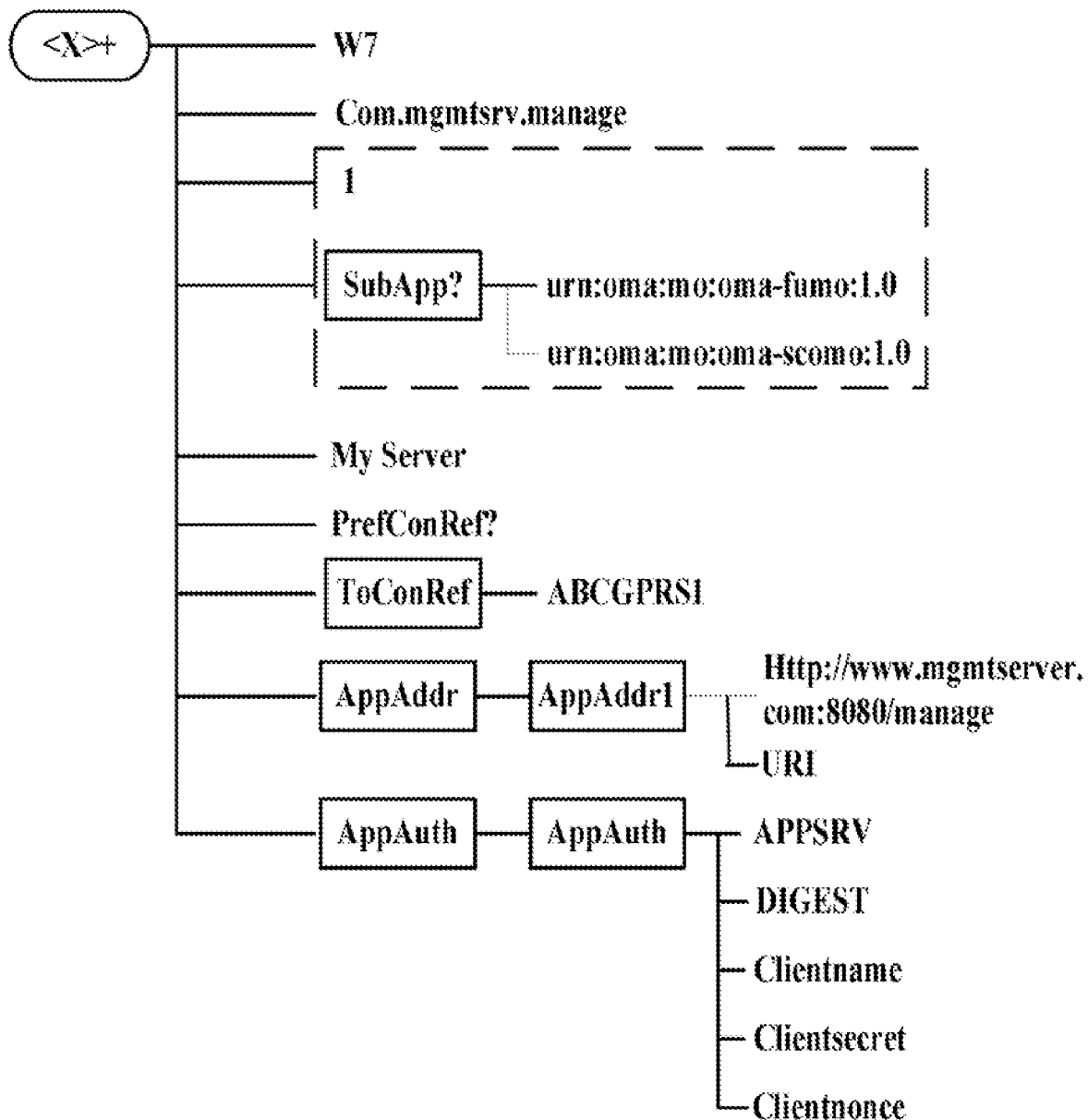
FIG. 11 shows a structure of a DMAcc of a server in a sixth embodiment of the present invention.

FIG. 11 shows a DMAcc of the server A. The ServerID of the server A is "com.mgmtsrv.manage"; the value of the Serverlevel is 1, namely, restricted administrator; the occurrence of the SubApp node is 1, and the content of its child node is "urn:oma:mo:oma-fumo:1.0" and "urn:oma:mo:oma-scomo:1.0", indicating that the server A has the rights to create an FUMO and an SCOMO. If the type of operated nodes in the command is FUMO and/or SCOMO, the rights of the server A meet the preset rights. Then, the terminal runs the command.

Certainly, using the Serverlevel as the rights management condition is only an example of the Add command. This condition may also be applicable to rights restriction of other commands, such as Replace, Get, Delete or Copy.

In the second embodiment to the fifth embodiment, when the DMAcc of the server A is created in the terminal, the terminal, server B or other device with the operation rights are assigned the rights of the server A in the created DMAcc to restrict the operation rights of the server A. When the server A establishes a session with the terminal and requests the terminal to run the command, the rights of the server A and the ACL of the operated node may be combined to manage the rights of the server.

Obviously, the combination of the second embodiment and the third embodiment is similar to the fifth embodiment.

Figure 12:
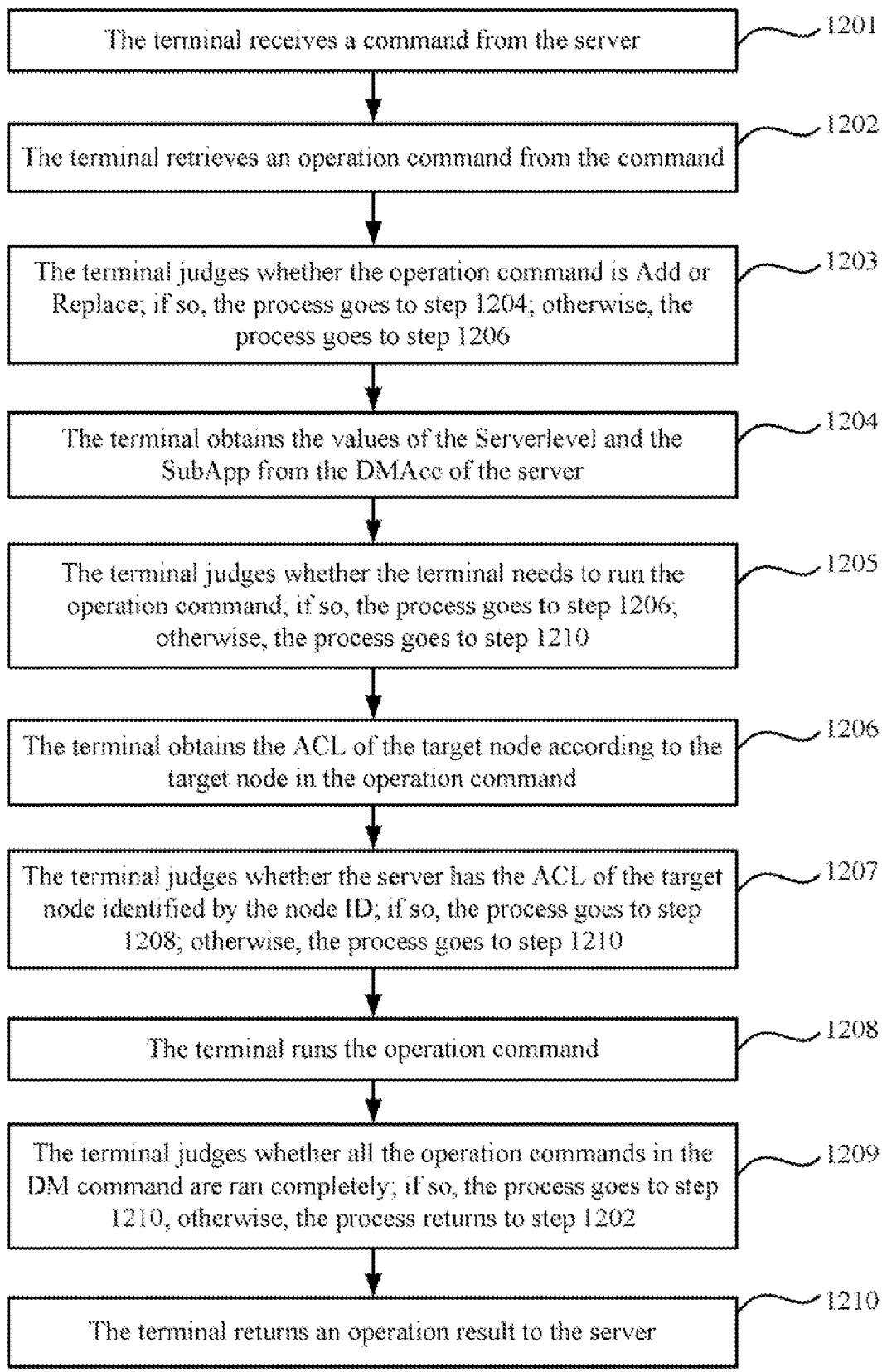
FIG. 12 is a flowchart of managing operations of a server by using the preset rights and ACL of the server in a sixth embodiment of the present invention.

FIG. 12 is a flowchart in the sixth embodiment. In this embodiment, when the server establishes a session with the terminal without changing the original ACL, the preset server rights and the ACL are used to manage the operations of the server. This embodiment is based on the fifth embodiment. As shown in FIG. 12, the process includes the following steps:

Step 1201: The terminal receives a command sent from the server.

The command may be a DM command.

Step 1202: The terminal retrieves a command from the command.

Step 1203: The terminal judges whether the command is Add or Replace; if so, the process goes to step 1204; otherwise, the process goes to step 1206.

In this embodiment, if the command is Copy rather than Add or Replace, the terminal divides the Copy command into multiple commands for execution.

Step 1204: The terminal obtains the values of the Serverlevel and the SubApp from the DMAcc of the server.

Step 1205: The terminal judges whether the terminal needs to run the command according to the information obtained in step 1204; if so, the process goes to step 1206; otherwise, the process goes to step 1210.

In the information obtained by the terminal in step 1204, if the value of the Serverlevel is 0, it indicates that the server has the administrator rights, and the process goes to step 1206; if the value of the Serverlevel is 2, it indicates that the server has the lowest administrator rights, and the process goes to step 1210; if the value of the Serverlevel is 1, the terminal judges whether the type of the operated node that runs the command is the type in the SubApp child node; if so, the process goes to step 1206; otherwise, the process goes to step 1210.

Step 1206: The terminal obtains the ACL of a target node in the command.

Step 1207: The terminal judges whether the server has the ACL of the target node identified by the node identifier; if so, the process goes to step 1208; otherwise, the process goes to step 1210.

If the ACL includes the server ID, the server has the ACL of the target node; otherwise, the server does not have the ACL of the target node.

Step 1208: The terminal runs the command.

Step 1209: The terminal judges whether all commands in the DM command are run completely; if so, the process goes to step 1210; otherwise, the process returns to step 1202.

Step 1210: The terminal returns an operation result to the server.

Obviously, if this embodiment is based on the second embodiment, the information obtained from the DMAcc by the terminal may be the value of the MOIOpAllowed in step 1204. When the value of the MOIOpAllowed is 1, the process goes to step 1206; when the value of the MOIOpAllowed is 0, the process goes to step 1210.

If this embodiment is based on the third embodiment, the information obtained from the DMAcc by the terminal may be values of the AllowedMO and its child node AllowedMOI in step 1204. When the type of the node that runs the command is the type in the AllowedMOI, the process goes to step 1206; otherwise, the process goes to step 1210.

If this embodiment is based on the third embodiment, the information obtained from the DMAcc by the terminal may be the value of the Serverlevel in step 1204. When the value of the Serverlevel is 0, the process goes to step 1206; when the value of the Serverlevel is 1, the process goes to step 1210.

Figure 13:
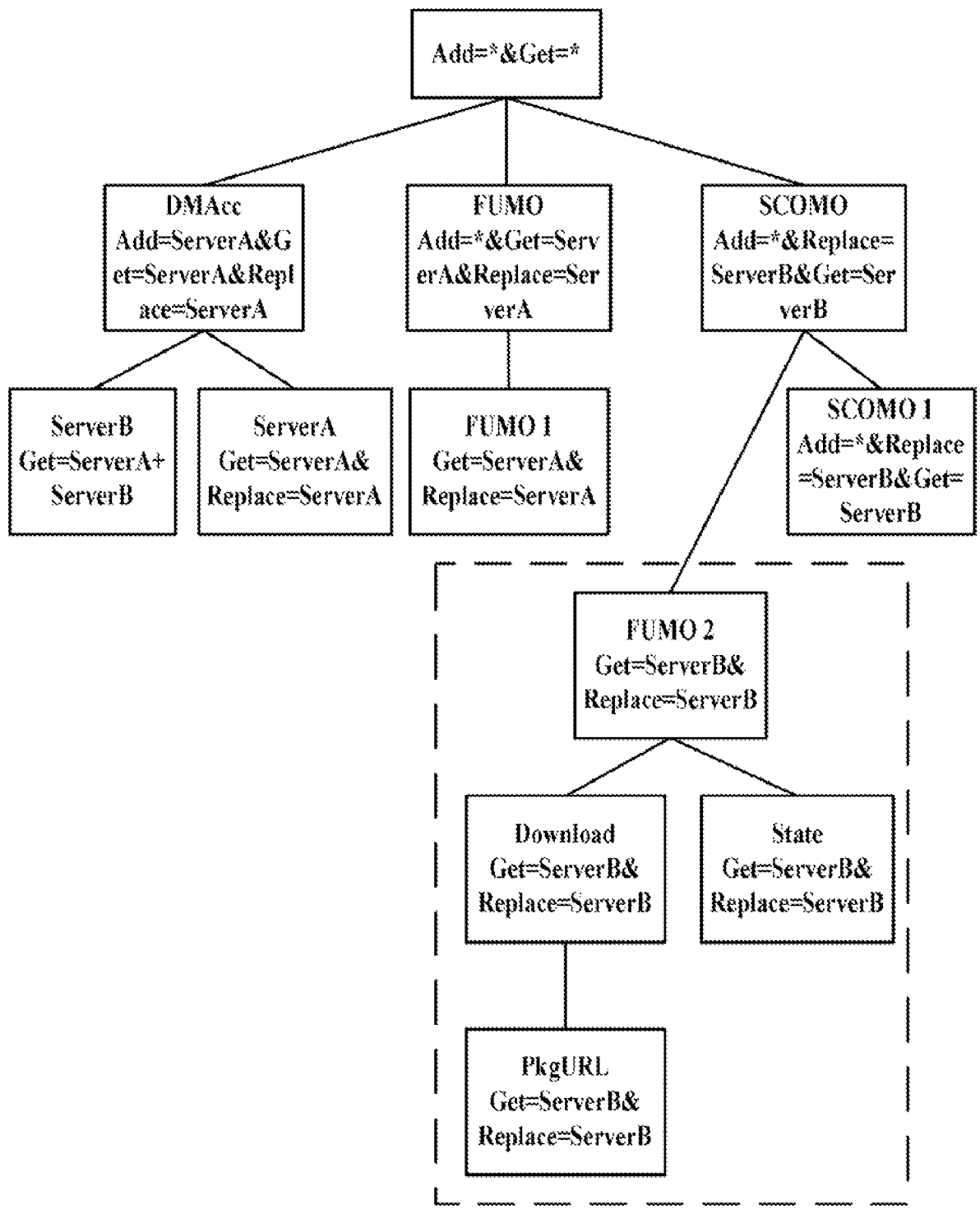
FIG. 13 is a flowchart of creating an FUMO in a seventh embodiment of the present invention.

The following describes a process of creating MOs in the DM tree by a server with reference to the seventh embodiment. In this embodiment, it is assumed that the server A may create nodes in the DM tree, but can only create SCOMO and DCMO nodes. That is, the value of the Serverlevel is 1, and the SubApp has MOIs of the SCOMO and the DCMO. The server A sends an Add command to the terminal, requesting to create an FUMO node "FUMO2" in the path "./SCOMO", as shown in the dashed border in FIG. 13.

The terminal determines that the type of the added node is FUMO according to the Item element of the Add command in the received DM message, and determines that the server A only has the rights to create SCOMO and FUMO nodes and does not have the rights to create an FUMO node according to the content in the DMAcc of the server A. Thus, the terminal returns a result indicating no operation rights (that is, failure to create FUMO2) to the server A.

In the preceding first embodiment to the seventh embodiment, when the terminal needs to determine the server rights, the terminal always needs to determine one or multiple information items in the DMAcc of the server before determining the server rights. Thus, in the eight embodiment of the present invention, the server rights are directly reflected in the MO. The following describes the method in the eighth embodiment based on the Add command and the server A.

Figure 14:
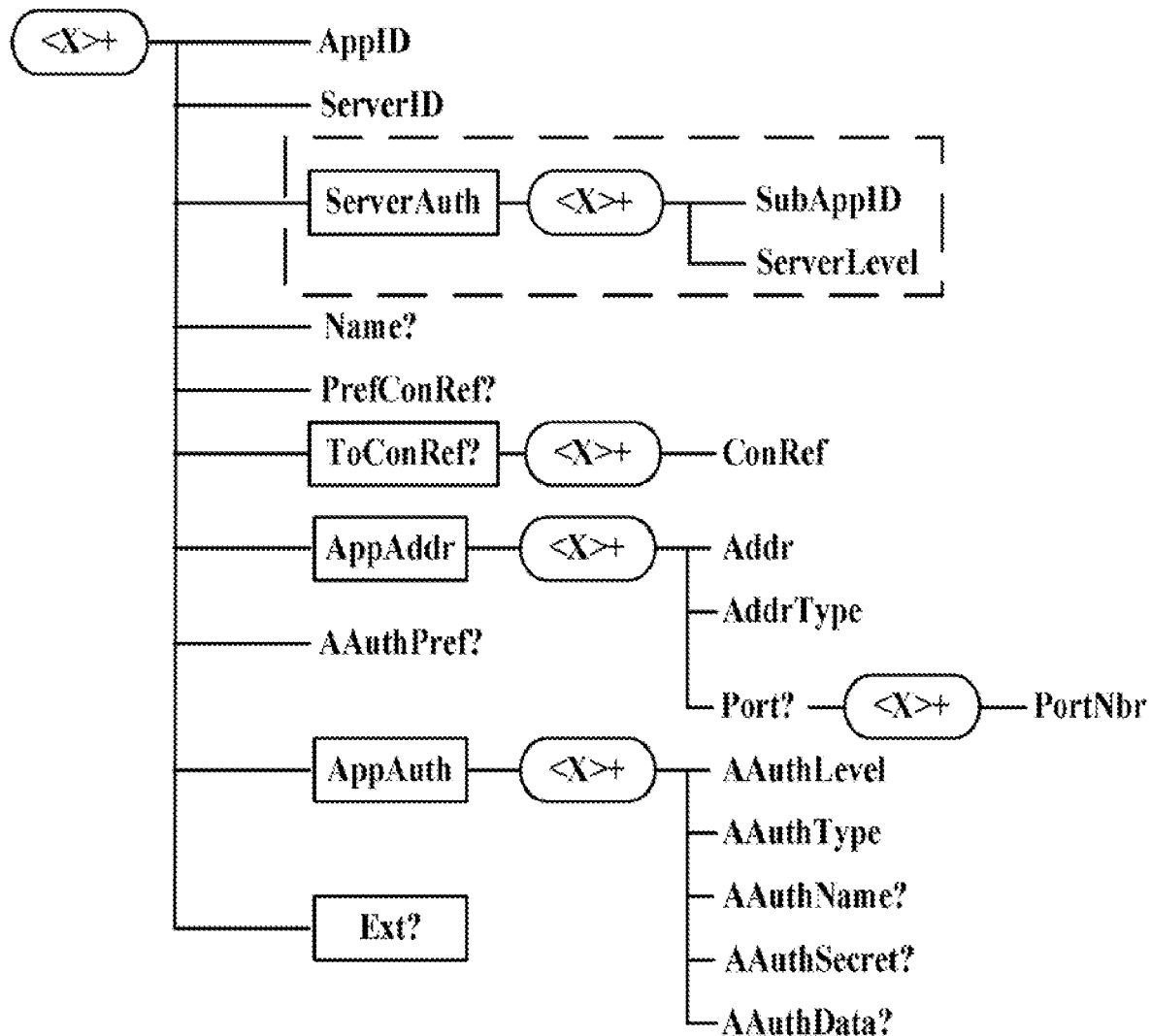
FIG. 14 shows a structure of a DMAcc of a server in an eighth embodiment of the present invention.

A ServerAuth node and its two child nodes (namely, Serverlevel and SubAppID) are added to the DMAcc of the server, as shown in the dashed border in FIG. 14. The ServerAuth node indicates the rights of the server A. Table 14 lists the information of the ServerAuth node. The Serverlevel node indicates the rights level of the server A. Table 16 describes the values of the Serverlevel node. If the server A can run the Add command conditionally, the SubAppID node indicates the type of nodes to be created. Table 17 lists contents of the SubAppID node, and Table 18 describes the contents of the SubAppID node.

TABLE 14

| Tree Occurrence | Format | Min. Access Types |
|---|---|---|
| One | Node | Get |

TABLE 15

| Tree Occurrence | Format | Min. Access Types |
|---|---|---|
| One | Integer (Int) | Get |

TABLE 16

| Serverlevel | Description |
|---|---|
| 0 | Able to perform any operation conditionally. |
| 1 | Able to perform the Add operation conditionally. |
| 2 | Able to run the Add command conditionally. |
| ... | ... |

TABLE 17

| Tree Occurrence | Format | Min. Access Types |
|---|---|---|
| One | Chr | Get |

TABLE 18

| SubAppID | Description |
|---|---|
| urn:oma:mo:oma-fumo:1.0(FUMO) | FUMO |
| urn:oma:mo:oma-scomo:1.0(SCOMO) | SCOMO |
| urn:oma:mo:oma-dcmo:1.0(DCMO) | DCMO |
| ... | |

The rights of the server A (that is, the ServerAuth) are determined by the Serverlevel and SubAppID. The server A may run any command on specified MOs or a specified type of nodes in the SubAppID if the value of the Serverlevel is 0; the server A may create specified MOs or a specified type of nodes in the SubAppID if the value of the Serverlevel is 1; the server A may execute specified MOs or a specified type of nodes in the SubAppID if the value of the Serverlevel is 2.

According to the preceding descriptions of embodiments, the terminal judges the rights to run the command sent by the server by combining the server rights and the ACL of the node.

The following describes how to add a server group to the ACL of the node to indicate the rights of a group of servers to operate the node, where the group is set in the DMAcc MO.

The group to which a server belongs is set in the DMAcc MO of the terminal.

Then, the group information is added to the ACL of the MO in the DM tree. For example, if the group information is "Group: 3", the ACL value after the group information is added is "Get=Group:3+ServerA".

After receiving the command of the server, the terminal judges whether the server or the group has the ACL of the target node identified by the node identifier; if so, the terminal runs the command.

The group may be defined according to the DM operation. For example, 0 indicates that the Add operation may be performed; 1 indicates that the Replace operation may be performed. In this case, the ACL indicates that all the servers in group 3 may perform the defined operation. The group may also be defined according to the home domain of the server (for example, domain.com). In this case, the ACL indicates that all the servers of the domain.com domain may operate the node.

Figure 15:
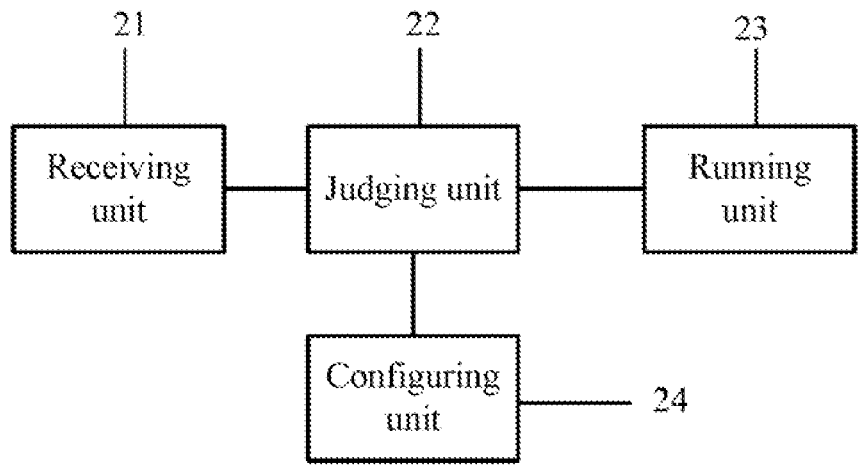
FIG. 15 shows a structure of a terminal in an embodiment of the present invention.

An embodiment of the present invention provides a terminal. As shown in FIG. 15, the terminal includes a receiving unit 21, a judging unit 22 and a running unit 23. The receiving unit 21 is adapted to receive a command that includes a node identifier of a target node from the server. The judging unit 21 is adapted to: judge whether the server rights meet the preset rights and whether the server has access rights of the target node identified by the node identifier in the command, and send the judgment result to the running unit 23. The running unit 23 is adapted to run the command if the received judgment result is that the server rights meet the preset rights and the server has the ACL of the target node.

The terminal further includes a configuring unit 24, adapted to configure a DMAcc MO of the server in the terminal, where the DMAcc MO includes rights of the server.

The configuring unit 24 includes a first establishing unit and a first adding unit. The first establishing unit is adapted to set the server rights in the DMAcc MO. The first adding unit is adapted to assign values to server rights added in the first establishing unit to indicate the type of operable nodes. The judging unit includes a first operating unit and a first determining unit. The first operating unit is adapted to: judge whether the type of operable nodes indicated in the server rights includes the type of nodes to be operated, and send the judgment result. The first determining unit is adapted to: if the judgment result received from the first operating unit is that the server rights include the type of nodes to be operated, determine that the server rights meet the preset rights; otherwise, determine that the server rights do not meet the preset rights.

The configuring unit includes a second establishing unit and a second adding unit. The second establishing unit is adapted to set the server rights in the DMAcc MO, and the second adding unit is adapted to assign values to the server rights in the second establishing unit to indicate whether the server can run the command, or indicate that the server can run the command conditionally and indicate the type of operable nodes. The judging unit includes a second operating unit and a second determining unit. The second operating unit is adapted to: judge whether the set server rights indicate that the server can run the command and whether the type of operable nodes includes the type of nodes to be operated, and send the judgment result. The second determining unit is adapted to: if the judgment result sent by the second operating unit is that the set server rights indicate that the server can run the command, determine that the server rights meet the preset rights; if the set server rights indicate that the server cannot run the command, determine that the server rights do not meet the preset rights; if the set server rights indicate that the server can run the command conditionally and the type of operable nodes includes the type of nodes to be operated, determine that the server rights meet the preset rights.

Figure 16:
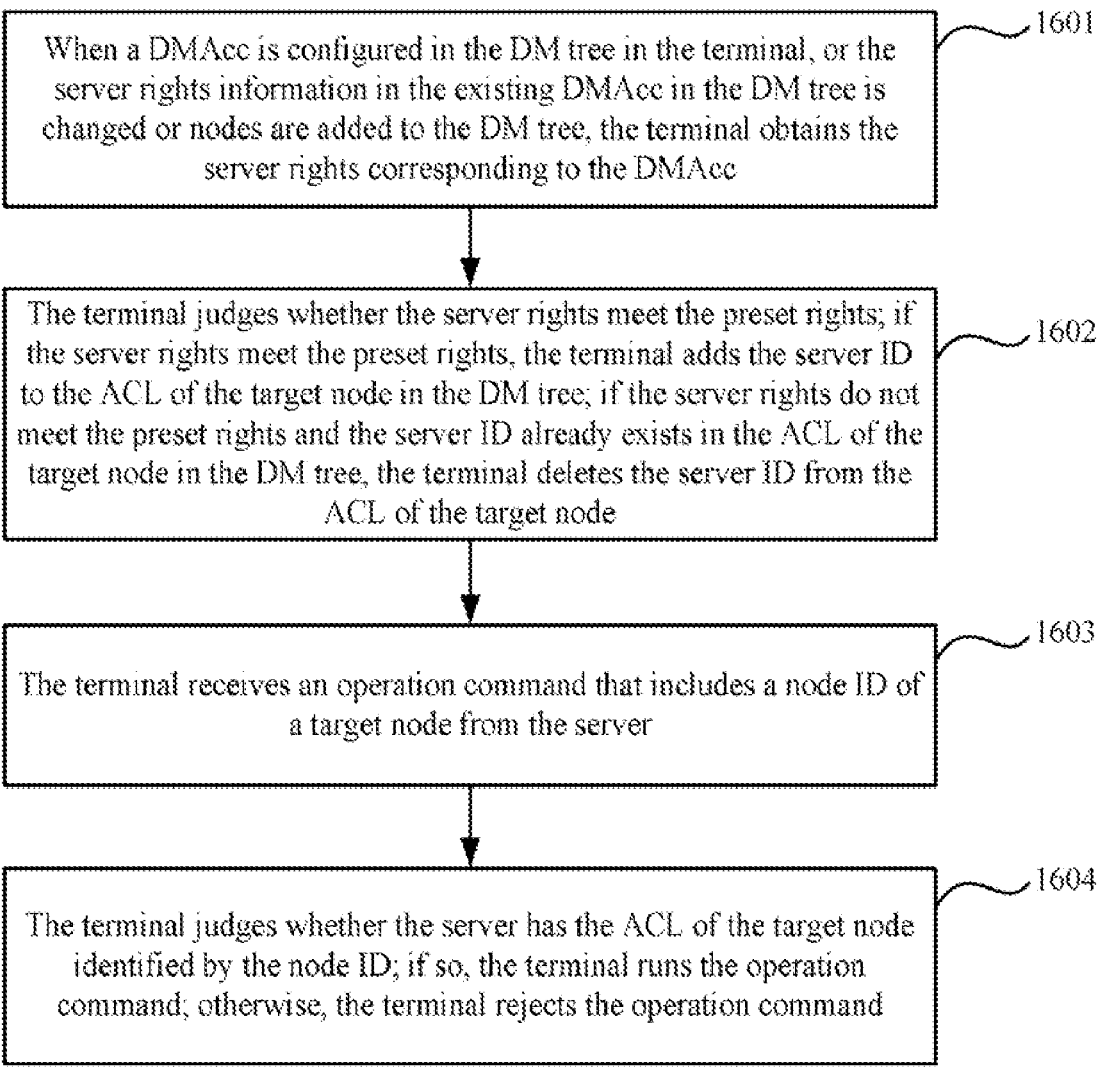
FIG. 16 is a flowchart of a method for access control in device management in an embodiment of the present invention.

The preceding solution controls the server rights by judging the server rights and the ACL. An embodiment of the present invention also provides a method for controlling the server rights by using the ACL only. As shown in FIG. 16, the method includes the following steps:

Step 1601: When a DMAcc is configured in the DM tree in the terminal, or the server rights information in the existing DMAcc in the DM tree is changed or nodes are added to the DM tree, the terminal obtains the server rights corresponding to the DMAcc.

The terminal may obtain the server rights in multiple modes, as described in the preceding second embodiment to the eighth embodiment.

The server rights indicate commands that the server can run and/or the type of target nodes that the server can operate.

Step 1602: The terminal judges whether the server rights meet the preset rights. If so, the terminal adds the server ID to the ACL of the target node in the DM tree; if the server rights do not meet the preset rights and the server ID already exists in the ACL of the target node in the DM tree, the terminal deletes the server ID from the ACL of the target node.

The target node in the DM tree may be a root node.

The method for judging whether the server rights meet the preset rights includes but is not limited to: judging whether to create nodes including a node of which the type is MOI or whether to change the rights of a node of which the type is MOI. That is, the terminal judges whether the server has the rights to create nodes in the DM tree or change the node type; if so, it indicates that the server rights meet the preset rights.

The judgment may also be made according to the methods provided in the second embodiment to the eighth embodiment.

If the server rights meet the preset rights, the server ID is added to the ACL of the Add command of the root node to generate a new ACL of the node. The node may be the root node. The rights of other commands are similar those of the Add command.

Step 1603: The terminal receives a command that includes a node identifier of a target node from the server.

Step 1604: The terminal judges whether the server has the ACL of the target node identified by the node identifier; if so, the terminal runs the command; otherwise, the terminal does not run the command.

If the ninth embodiment is based on the information in the eighth embodiment, the ACL of a node may be set to "Serverlevel: 1 SubApp: 2, 3+ServerA" when the server rights are determined by the Serverlevel and the SubApp, where the middle ACL is "Serverlevel: 1 SubApp: 2, 3". If a new DMAcc is added or the information of the Serverlevel and/or the SubApp is changed in a DMAcc, a new ACL is generated according to the middle ACL and added/changed information of the Serverlevel and the SubApp.

For example, the ACL of an X node is "Exec=ServerA+ServerB", where the middle ACL is "Exec=Serverlevel: 1 SubApp: 2". If a new DMAcc is added and its ACL is ServerL, the value of the Serverlevel is 1 and the values of the SubApp are 2 and 3. The server that manages the X node is at the restricted administrator level, and can only operate SCOMO nodes. The server corresponding to the new DMAcc is also at the restricted administrator level and can operate DCMO nodes besides SCOMO nodes. That is, the new server can meet the requirement of the X node. Thus, the ACL of the X node is changed to "Exec=ServerA+ServerB+ServerL".

If the ninth embodiment is based on the information in the second embodiment and the fourth embodiment, the terminal updates the rights of the node according to the rights in the DMAcc of the server. Taking the update of Add rights of the root node as an example, if the value of the MOIOpAllowed in the DMAcc is 1 (or the value of the Serverlevel is 0), the server rights meet the requirement of the root node, and the server rights are added to the Add rights of the root node; otherwise, the server rights do not meet the requirement of the root node, and the server rights are not added to the Add rights. For example, the Add rights of the root node are equal to the rights of the server B. After a DMAcc of the server A is added, if the value of the Serverlevel is 0 or 1 or the value of the MOIOpAllowed is 1, the Add rights of the root node are equal to the rights of the server A and the server B.

Based on the preceding description of the ninth embodiment, an embodiment of the present invention provides a system for access control in device management. As shown in FIG. 4, the system includes a server 12 and a terminal 11. The server 12 is adapted to send a command that includes a node identifier of a target node to the terminal 11. The terminal 11 is adapted to: judge whether the server rights meet the preset rights; if the server rights meet the preset rights, add the ID of the server 12 to the ACL of the node in the DM tree; if the server rights do not meet the preset rights and the server ID already exists in the ACL of the target node in the DM tree, delete the server ID from the ACL of the target node; after receiving the command, judge whether the server 12 has the ACL of the target node identified by the node identifier; if so, run the command.

The terminal 11 is further adapted to: configure a DMAcc MO that includes rights of the server 12 in the server; or change the server rights in the DMAcc of the server 12; or add nodes to the DM tree.

In this embodiment, the process of judging whether the server rights meet the preset rights in the system is the same as the system that implements access control in device management in an embodiment shown in FIG. 4.

Figure 17:
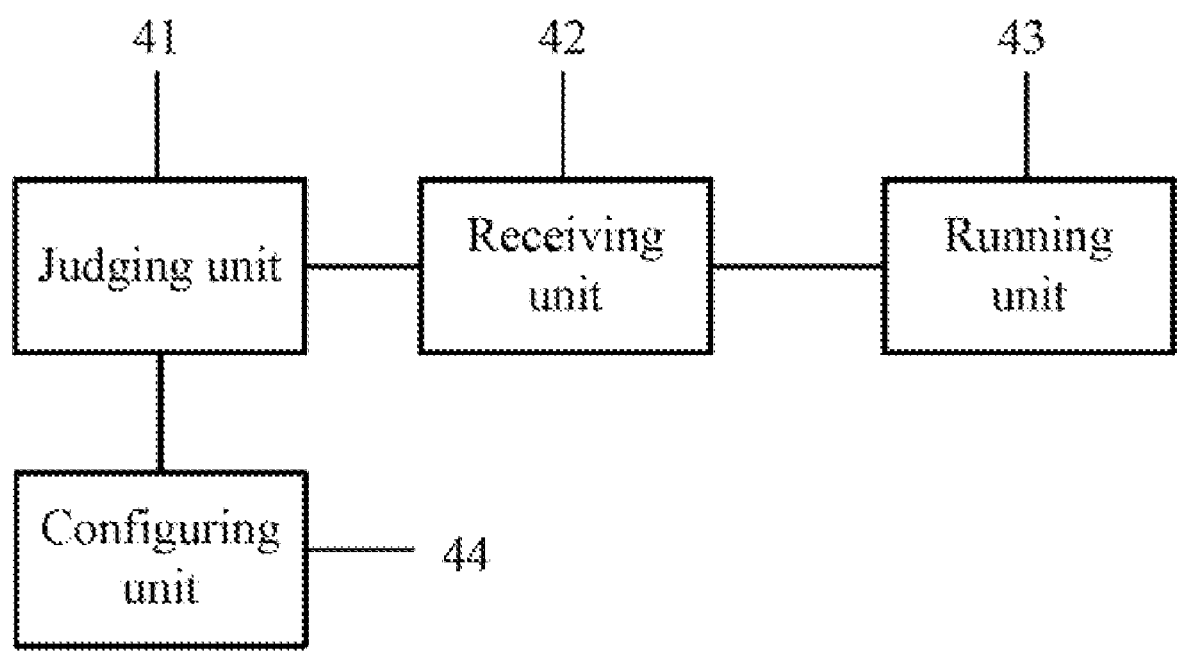
FIG. 17 shows a structure of a terminal in an embodiment of the present invention.

An embodiment of the present invention also provides a terminal. As shown in FIG. 17, the terminal includes a judging unit 41, a receiving unit 42 and a running unit 43. The judging unit 41 is adapted to: judge whether the server rights meet the preset rights; if the server rights meet the preset rights, add the server ID to the ACL of the node in the DM tree; if the server rights do not meet the preset rights and the server ID already exists in the ACL of the target node in the DM tree, delete the server ID from the ACL of the target node. The receiving unit 42 is adapted to: receive a command that includes a node identifier of a target node from a server, judge whether the server has the ACL of the target node identified by the node identifier, and send the judgment result to the running unit 43. The running unit 43 is adapted to: if the judgment result is that the server has the ACL of the target node, run the command; otherwise, does not run the command.

The terminal further includes a configuring unit 44, adapted to: configure a DMAcc MO that includes server rights in the server; or change the server rights in the DMAcc of the server; or add nodes to the DM tree.

The server rights indicate operations that the server can perform and/or the type of target nodes that the server can operate.

In this embodiment, the working process of judging whether the server rights meet the preset rights by the terminal is the same as the terminal obtained according to FIG. 15.

The method, system and terminal provided in the embodiments of the present invention can control the MOs and restrict the type of MOs, thus improving the security and reliability of the system.

Although the invention has been described through several exemplary embodiments, the invention is not limited to such embodiments. It is apparent that those skilled in the art can make various modifications and variations to the invention without departing from the spirit and scope of the invention. The invention is intended to cover these modifications and variations provided that they fall in the scope of protection defined by the following claims or their equivalents.

Through the preceding description of the embodiments of the present invention, it is understandable to those skilled in the art that the embodiments of the present invention may be implemented by hardware or by software in combination with a necessary hardware platform. Thus, the technical solution of the present invention may be made into software. The software may be stored in a non-volatile storage medium (for example, a CD-ROM, a USB disk, and a mobile hard disk), and include several instructions that instruct a computer device (that is, a PC, a server, or a network device) to perform the methods provided in each embodiment of the present invention.

Although the invention has been described through several exemplary embodiments, the invention is not limited to such embodiments. It is apparent that those skilled in the art can make various modifications and variations to the invention without departing from the scope of the invention. The present invention is intended to cover such modifications and variations provided that they fall in the scope of protection defined by the following claims or their equivalents.

What is claimed is:

1. A method for access control in device management, comprising:
    configuring, by a terminal, a management object (MO) of a device management account (DMAcc) of a server in the terminal based on an OMA DM protocol, wherein the MO of the DMAcc includes preset rights, and the preset rights indicate whether the server has rights to create a node of which a type is a management object identifier (MOI) or to change the type of the node to the MOI;
    receiving, by the terminal, a command that comprises the MOI and a node identifier of a target node from a server; and
    judging whether the rights of the server meet preset rights according to the MOI included in the command;
    judging whether the server has access rights of the target node identified by the node identifier according to an access control list (ACL) of the target node; and
    running the command when the rights of the server meet the preset rights and the server has the access rights of the target node identified by the node identifier.

2. The method of claim 1, wherein the preset rights are added or modified by the terminal or a server which creates the MO of the DMAcc.

3. The method of claim 1, wherein the command comprises an Add command or a Replace command.

4. The method of claim 3, wherein the Add command is adapted to create the node or the MO of which the type is the MOI; and the Replace command is adapted to change the type of the target node to the MOI.

5. A system for access control in device management, comprising:
    a server having a processor adapted to send a command that includes a management object identifier (MOI) and a node identifier of a target node; and
    a terminal having a processor adapted to configure a management object (MO) of a device management account (DMAcc) of a server in the terminal based on an OMA DM protocol, wherein the MO of the DMAcc includes preset rights, the preset rights indicate whether the server has rights to create a node of which a type is a management object identifier (MOI) or to change the type of the node to the MOI, judge whether the rights of the server meet preset rights according to the MOI included in the command after receiving the command from the server, judge whether the server has access rights of the target node identified by the node identifier according to an access control list (ACL) of the target node; and run the command when the rights of the server meet the preset rights and the server has the access rights of the target node identified by the node identifier.

6. A terminal, comprising:
    a processor; and
    a computer-readable medium for storing computer-executable instructions, which, when executed by the processor, cause the processor to:
    receive a command that includes a management object identifier (MOI) or a node identifier of a target node from a server;
    configure a management object (MO) of a device management account (DMAcc) of a server in the terminal based on an OMA DM protocol, wherein the MO of the DMAcc includes preset rights, the preset rights indicate whether the server has rights to create a node of which a type is a management object identifier (MOI) or to change the type of the node to the MOI;
    judge whether the rights of the server meet preset rights according to the MOI included in the command, and judge whether the server has access rights of the target node identified by the node identifier according to a access control list (ACL) of the target node, and send the judgment result; and
    run the command when the judgment result is that the rights of the server meet the preset rights and the server has the access rights of the target node.

* * * * *